United States Patent [19]

Bacardit et al.

[11] Patent Number: 4,924,722
[45] Date of Patent: May 15, 1990

[54] RECIRCULATING BALL MECHANISM

[75] Inventors: Juan S. Bacardit; E. Cortes Guasch, both of Barcelona, Spain

[73] Assignee: Bendix Espana, Barcelona, Spain

[21] Appl. No.: 297,895

[22] Filed: Jan. 17, 1989

[30] Foreign Application Priority Data

Jan. 18, 1988 [EP] European Pat. Off. ........ 88500003.4

[51] Int. Cl.⁵ .............................................. F16H 25/22
[52] U.S. Cl. .................... 74/459; 74/388 PS; 74/499
[58] Field of Search .................... 74/499, 459, 388 PS

[56] References Cited

U.S. PATENT DOCUMENTS

| | | | |
|---|---|---|---|
| 2,410,049 | 10/1946 | Davis | 74/388 PS |
| 2,486,055 | 10/1949 | Mort et al. | 74/459 |
| 3,498,153 | 3/1970 | Wagner | 74/459 |
| 3,898,890 | 8/1975 | Simmons et al. | 74/459 |

FOREIGN PATENT DOCUMENTS

| | | | |
|---|---|---|---|
| 526735 | 9/1940 | United Kingdom | 74/459 |
| 813741 | 5/1959 | United Kingdom | 74/424.8 R |

*Primary Examiner*—Allan D. Herrmann
*Assistant Examiner*—Janice E. Chartoff
*Attorney, Agent, or Firm*—Larry J. Palguta; Ken C. Decker

[57] ABSTRACT

Recirculating ball mechanism comprising a body (10), an actuator shaft (16) rotatably mounted within the body (10) and turnable in response to rotation of an input shaft (12), an output piston (18) slidably mounted in the body (10), a bore (22) within the output piston (18) in which is received an end (26) of the actuator shaft (16), the bore (22) having an internal threaded surface (24), the end (26) of the actuator shaft (16) being formed with a threaded surface (28), a series of balls (30) located between the two threaded surfaces (24, 28) so as to operatively connect the actuator shaft (16) to the output piston whereby a given rotation of the actuator shaft (16) produces an associated displacement of the output piston (18) in the body (10), and mechanism (42, 44) for recirculating the balls (30) to a point of origin in the thread (28) formed on the actuator shaft (16) characterized in that the thread (28) comprises at least one closed loop (40) extending around the circumference of the actuator shaft (16) and including a first part (42), and a second part (44) formed so as to allow the balls (30) to pass across the thread (24) of the output piston (18).

5 Claims, 3 Drawing Sheets

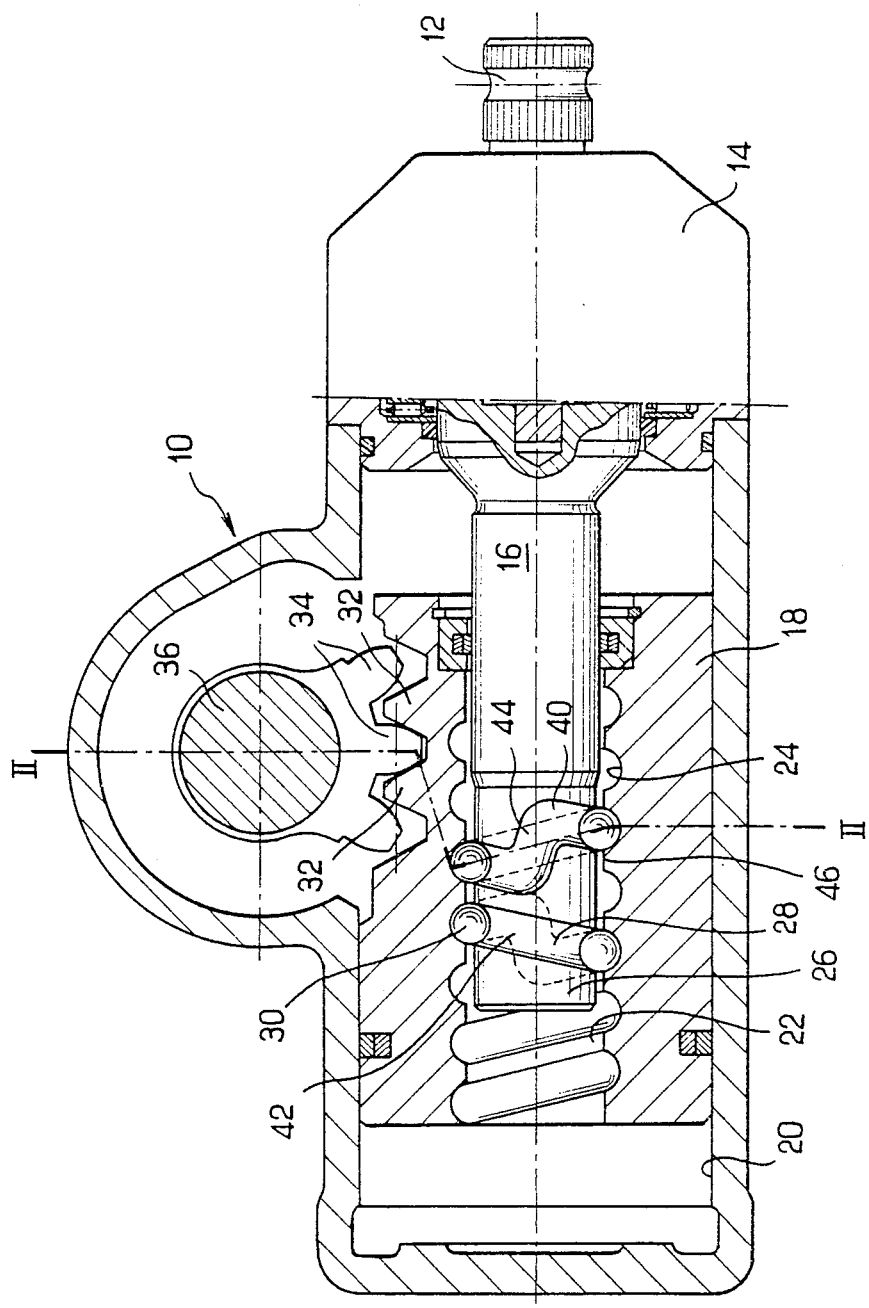
FIG_1

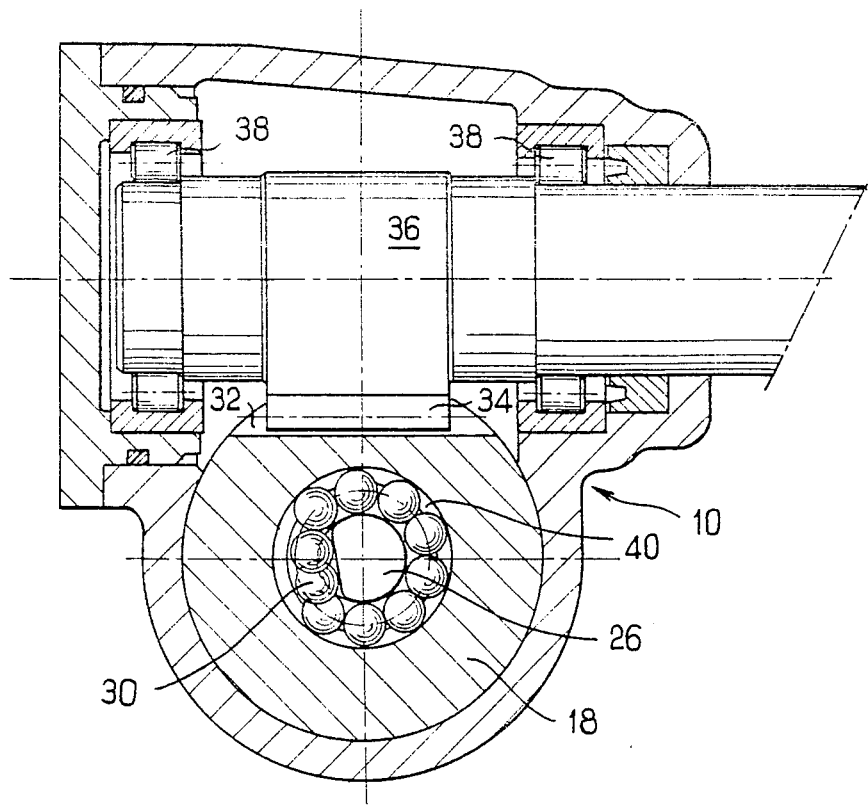
FIG_2

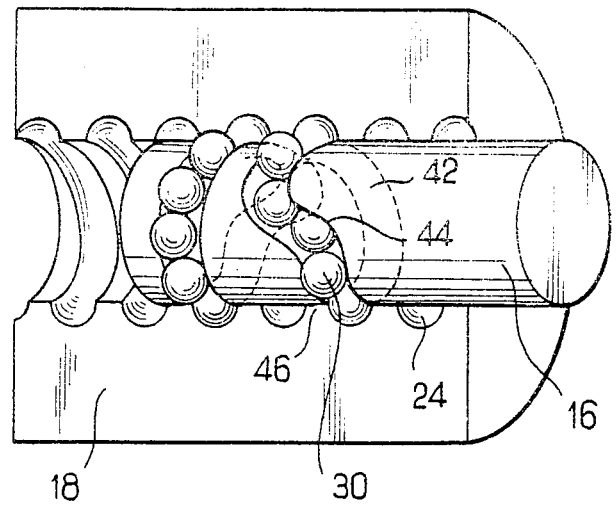
FIG_3
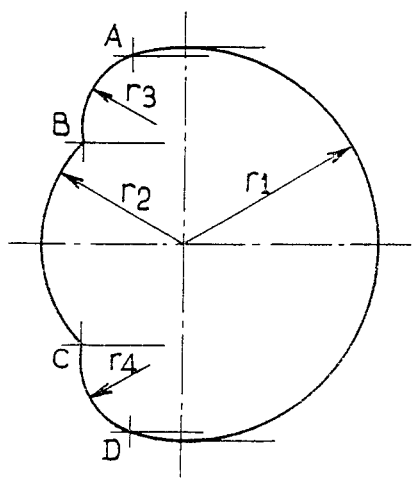
FIG_4A
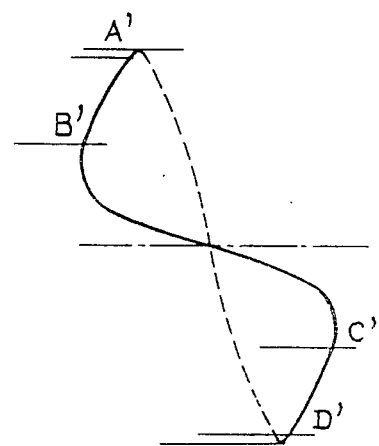
FIG_4B

RECIRCULATING BALL MECHANISM

The present invention relates to a recirculating ball mechanism and more particularly, but not exclusively, to a recirculating ball steering mechanism for automotive vehicles.

In general such a steering assembly comprises an actuator shaft adapted to be rotatably driven by the steering wheel of a vehicle and formed with a screw thread. The actuator shaft is received inside a slideably mounted output piston and operable connected thereto by a series of balls located in the screw thread of the actuator shaft and in a corresponding screw thread on an inner surface of the output piston. Rotation of the actuator shaft causes the balls to progress along the thread and means are therefore provided to recirculate the balls to their point of origin.

It is desirable to provide the means for recirculating the balls in the actuator shaft itself. An example of a steering assembly in which the balls are recirculated through the actuator shaft is given in FR-A-No. 2 403 495. This document describes a composite actuator shaft in which a return passage is formed through a core member mounted in a blind bore in the actuator shaft. This device has the disadvantage that both the actuator shaft and the inner core member are difficult to manufacture resulting in complex and expensive assembly.

It is therefore an object of the present invention to provide a recirculating ball mechanism in which the return passage for the balls is located in the actuator shaft and which is of simple construction.

According to the invention there is provided a recirculating ball mechanism comprising a body, an actuator shaft rotatably mounted within the body and turnable in response to rotation of an input shaft, an output piston slideably mounted in the body, a bore within the output piston in which is received an end of the actuator shaft, the bore having an internal threaded surface, the end of the actuator shaft being formed with a threaded surface, a series of balls located between the two threaded surfaces so as to operatively connect the actuator shaft to the output piston whereby a given rotation of the actuator shaft produces an associated displacement of the output piston in the body, and means for recirculating the balls to a point of origin in the thread formed on the actuator shaft characterized in that the thread comprises at least one closed loop extending around the circumference of the actuator shaft and including a first part, and a second part formed so as to allow the balls to pass across the thread of the output piston.

The present invention will now be described by way of example with reference to the accompanying drawings, in which:

FIG. 1 is a partial longitudinal section through a recirculating ball mechanism in accordance with the present invention;

FIG. 2 is a cross-sectional view taken along the line II—II in FIG. 1.

FIG. 3 is a schematic perspective view of a part of the mechanism of FIG. 1; and FIGS. 4a and 4b are curves defining the form of the screw thread of a part of the mechanism shown in FIG. 1.

As shown in FIG. 1 a recirculating ball mechanism which, in the example shown is a steering assembly, comprises a body 10 in which is rotatably mounted an input shaft 12 destined to be connected to the steering column of a vehicle (not shown). The input shaft 12 is connected to a power steering valve assembly which is located at an end of the body 10 in a region shown by reference numeral 14. An actuator shaft 16 is operably connected to the input shaft 12 and projects into the interior of the body 10. An output piston 18 is slideably mounted in a bore 20 formed in the body 10 and receives the actuator shaft 16 in a longitudinally extending bore 22. The internal surface of the bore 22 in the output piston 18 is formed with a continuous helical thread 24. The distal end 26 of the actuator shaft 16 is of reduced diameter and is formed with a screw thread 28 which will be described in greater detail below. A series of balls 30 are located in the interstices between the two screw threads 24 and 28 and serve to operatively connect the actuator shaft 16 to the output piston 18 in such a way that rotation of the actuation shaft 16 in a given direction will produce a corresponding displacement of the output piston 18 in the bore 20.

The outer surface of the output piston 18 has a number of gear teeth 32 defined therein which are adapted to mesh with corresponding teeth 34 formed on an output shaft 36. As shown in FIG. 2 the output shaft 36 is rotatably mounted in the body 10 by means of two roller bearings 38.

In accordance with the invention, the screw thread 28 includes means to recycle the balls 30 so as to allow a continuous movement of the output piston 18 relative to the actuator shaft 16. The screw thread 28 comprises a number, two in the illustrated example, of separate closed loops 40 which extend around the circumference of the end 26 of the actuator shaft 16. As shown in FIG. 2, each loop 40 contains a contiguous series of balls 30. Each loop 40 comprises a first part 42, corresponding approximately to half the circumference of the end 26 of the actuator shaft 16, which is of part-helical form and which corresponds to the shape of the thread 24 formed in the output piston 18. In order to allow the recirculation of the balls 30, a second part 44 of the thread 28 completes the loop 40. The second part 44 has a generally Z-shape. In order to avoid engagement by the balls 30 in the second part 44 of the loop 40 with the opposing, projecting part 46 of the thread 24 formed in the output piston 18, the radial depth of the second part 44 is greater than that of the first part 42 or that of the thread 24. At the point where a recirculating ball 30 crosses the projecting part 46 of the thread 24, the radial depth of the second part 44 is approximately equivalent to the diameter of one of the balls 30 so that the ball 30 may pass under the projecting part 46. A clearer understanding of this feature may be had from FIG. 3 which shows the balls 30 in the second part 44 of the thread 28 which are below the projecting part 46 of the thread 24.

In the preferred embodiment the two loops 40 are formed in the actuator shaft 16 in such a way that the respective second parts 44 are arranged at approximately 180° to each other so as to more evenly distribute the load on the output piston 18.

The precise form of the thread 28 will now be described with reference to the curves shown in FIGS. 4a and 4b. The base line shown in FIGS. 4a and 4b is defined as the path taken by the center of a given ball 30 relative to the longitudinal axis of the actuator shaft 16, starting and finishing at the same given point after a complete rotation around the circumference of the shaft 16. The base line forms a closed, compound, irregular figure which may nominally be divided into the following sections.

The embracement area, A→D in FIG. 4a. In this part of the thread the actual mechanical work is performed and this part corresponds to the first part 42 which has already been discussed above. The angle of development of the helix around the longitudinal axis depends on a number of factors such as the load to be borne and the number of thread loops 40.

The connection areas, A→B and C→D in FIG. 4a. These parts of the curve correspond, respectively to the entry of a ball into, and its exit from, the second part 44 of the loop 40. The base line in these parts of the curve corresponds to a helical line with constant feed for the full portion of rotation, but with a variable radius. The projection of these parts of the base line on to a sloping plane tangential to the base helix produces two symmetrical arcs relative to the transverse axis of symmetry of the end 26 of the actuator shaft 16.

The inflection area, B→C in FIG. 4a. In this area the balls 30 move from one end to the other of the connection area, thus completing their path around the longitudinal axis of the actuator shaft 16. The base line in this portion is obtained by the succession of points situated at a constant distance from the longitudinal axis of the actuator shaft 16, with variable feed. This feed may be determined by a sine function or by the connection of two radii and the sign is negative relative to the feed of the base helix of the embracement area.

FIG. 4B is a projection of FIG. 4A in axial form and points A,B,C,D of FIGS. 4A thus correlate to points A',B',C',D', of FIG. 4B.

Thus, it will be seen that, in accordance with the invention the construction of the assembly is simplified with respect to previously proposed assemblies. It is envisaged that, in order to further reduce costs, the loop may be cut by numerically controlled machines or by formation by microfusion.

We claim:

1. A recirculating ball mechanism comprising a body, an actuator shaft mounted rotatably within said body and rotatable in response to rotation of an input shaft, an output piston mounted slidably in said body, a bore within said output piston in which is received an end of the actuator shaft, said bore having an internal threaded surface, said end of said actuator shaft being formed with a threaded surface, a series of balls located between said two threaded surfaces so as to connect operatively said actuator shaft to said output piston whereby a given rotation of said actuator shaft produces an associated displacement of said output piston in said body, and means for recirculating said balls to a point of origin in said thread of said end of said actuator shaft, said recirculating means formed at said actuator shaft, said thread of the actuator shaft comprising at least one closed loop extending around the circumference of said actuator shaft, said closed loop including a first part of part helical form corresponding to said thread of said output piston, a second part including a region whose radial depth is at least equal to the diameter of said balls, a third part and a fourth part corresponding respectively to the entry of a ball into and the exit of a ball from said second part, said third and fourth parts each being of part helical form with constant feed and a variable radius relative to a longitudinal axis of the actuator shaft, and the third and fourth parts comprising symmetrical arcs relative to a transverse axis of the actuator shaft.

2. The mechanism as claimed in claim 1, wherein said second part of said loop has a generally Z-shape.

3. The mechanism as claimed in claim 2, wherein a base line of said loop forms a closed, compound, irregular Figure.

4. The mechanism as claimed in claim 3, wherein two loops are disposed at said actuator shaft so that the second parts of said loops are disposed substantially 180° from each other.

5. The mechanism as claimed in claim 3, wherein said input shaft is associated with a power steering valve assembly.

* * * * *